US011391099B2

(12) United States Patent
Jahn et al.

(10) Patent No.: US 11,391,099 B2
(45) Date of Patent: Jul. 19, 2022

(54) METHOD AND APPARATUS FOR REMOVING TUBING STRING BANDS

(71) Applicant: BAND SHARK CO. LTD., Red Deer County (CA)

(72) Inventors: Clayton Allan Jahn, Red Deer (CA); Martin Harvey David Schmidt, Midland, TX (US); Christopher Shaun Mcclelland, Red Deer (CA); Stephen Joseph Hurst, High Level (CA)

(73) Assignee: BAND SHARK CO. LTD., Red Deer County (CA)

( * ) Notice: Subject to any disclaimer, the term of this patent is extended or adjusted under 35 U.S.C. 154(b) by 115 days.

(21) Appl. No.: 16/889,007

(22) Filed: Jun. 1, 2020

(65) Prior Publication Data
US 2021/0215005 A1      Jul. 15, 2021

Related U.S. Application Data

(60) Provisional application No. 62/959,637, filed on Jan. 10, 2020.

(51) Int. Cl.
| | |
|---|---|
| *E21B 19/00* | (2006.01) |
| *E21B 17/02* | (2006.01) |
| *E21B 29/04* | (2006.01) |
| *B23D 33/02* | (2006.01) |

(52) U.S. Cl.
CPC ............ *E21B 19/00* (2013.01); *B23D 33/025* (2013.01); *E21B 17/026* (2013.01); *E21B 29/04* (2013.01)

(58) Field of Classification Search
CPC ........ E21B 19/00; E21B 17/026; E21B 29/04; B23D 33/025; Y10T 29/49821
See application file for complete search history.

(56) References Cited

U.S. PATENT DOCUMENTS

| | | | | |
|---|---|---|---|---|
| 4,314,400 | A * | 2/1982 | Davis ..................... | B26D 1/025 166/243 |
| 7,134,374 | B1 * | 11/2006 | Williamson ............ | E21B 29/04 83/597 |
| 8,225,855 | B2 * | 7/2012 | Ramsey .................. | E21B 29/04 166/55 |
| 8,882,066 | B2 * | 11/2014 | Otten ..................... | B65D 63/00 248/230.8 |
| 9,376,294 | B2 * | 6/2016 | Fetters, III ............... | B66D 1/82 |
| 9,884,429 | B2 * | 2/2018 | Payne ...................... | B26D 3/08 |
| 2019/0308256 | A1 * | 10/2019 | Farley, Jr. .............. | B23D 33/08 |

* cited by examiner

*Primary Examiner* — Nicole Coy
(74) *Attorney, Agent, or Firm* — Bennett Jones LLP

(57) ABSTRACT

An oilfield band cutter is useful for removing a band from a tubing string structure as the tubing string structure is being pulled up from the well. The oilfield band cutter includes a base frame with a central hole, an axis extending vertically and centrally through the frame coaxial with the central hole. A tubing follower member is coupled to the base frame and is positioned against an outer surface of the tubing string structure. A cutter is coupled to the tubing follower member, the cutter including an underside having a cutting edge. The cutting edge is positioned to engage against and cut bands on the tubing string structure.

21 Claims, 13 Drawing Sheets

METHOD AND APPARATUS FOR REMOVING TUBING STRING BANDS

FIELD

The present invention relates to oil and gas tubular string handling and, in particular, for handling tubular strings having bands thereon.

BACKGROUND

The oilfield industry uses tubing strings for a number of purposes, for drilling, completing and producing the well. A tubing string is generally installed in by lowering a distal end of the string into a borehole. The tubing string can be continuous or constructed of a plurality of pipes connected end to end, such as at threaded joints. The oilfield operations are conducted on a rig and the tubing string is run into the well from operations on the rig floor. After a wellbore operation is complete or if a tubing string component requires attention, the tubing string is pulled out of the well. The tubing string is pulled up through a hole in the rig floor. The tubing string extends along an elongate work space called "hole center" centered on "well center".

Oil and/or gas wells may be equipped with control lines for electrically, hydraulically or optically linking various downhole devices to the surface. For example, control lines may be cables, wires, etc. used to receive data from downhole instruments and to selectively operate, from the surface, downhole devices such as valves, switches, sensors, relays or other devices.

Control lines are generally of a small diameter compared to the diameter of the pipe string to which they may be secured, and are generally between 0.5 and 6 cm. in diameter. Control lines may be generally aligned along the length of a portion of the outer surface of a pipe string, generally parallel to the center axis of the bore of the pipe string. The control line may be secured to the pipe string using a clamp, tie, strap, tether, band or other device, which are collectively herein termed a "band". For example, but not by way of limitation, a protective band may be applied to secure the control line to the pipe string at plural positions along the pipe string. The bands are pulled tight around the tubing string and cable. The bands may have a taut portion that extends across the valley from the thickness of cable to the larger diameter thickness of the tubing string.

When the pipe string with one or more control lines attached by bands is being pulled out of the hole, the bands are often removed by workers who cut the bands. This process presents a safety concern, as workers need to be right at the well head. Also, while it is desirable to pull the string out of the hole with a fairly consistent speed, band cutting impedes the process. In particular, the workers cannot keep up and the tubing bands cannot always be cut quickly, requiring the tubing string pull-out-of-hole process to be interrupted.

What is needed is a method and apparatus for safely and efficiently removing control line bands from a pipe string as the pipe string is being pulled out of the well.

SUMMARY

The invention relates to a method and an apparatus for removing tubing string bands in wellbore operations.

In accordance with a broad aspect of the invention, there is provided an oilfield band cutter comprising: a tubing follower member maintained over an elongate work area through which a tubing string can pass along an axis, the tubing follower member having a face with an elongate groove; and a cutter coupled for movement with the tubing follower member, the cutter protruding in the elongate work area and including an underside on which a cutting edge is positioned.

In accordance with another aspect of the invention, there is provided an apparatus for removing an external structure from a tubing string structure comprising: a frame including a base with a central hole, a center vertical axis of the central hole extending vertically and centrally through the frame and defining an elongate vertical work area within the frame having a diameter the same as the central hole; a tubing follower member coupled to the base and positioned in the elongate vertical work area; and a cutter coupled to the tubing follower member, the cutter having an underside defining a cutting edge positioned in the elongate vertical work area, wherein the cutting edge is configured to cut the external structure from the tubing string structure while the tubing string structure is moving upwardly through the elongate vertical work area.

In accordance with another aspect of the invention, there is provided a method for removing a band from a tubing string structure as the tubing string structure is being moved up from the well, the method comprising: positioning a tubing follower member against a side of the tubing string structure as the tubing string structure is moved up from the well past the tubing follower member, the tubing follower member carrying a cutter with a cutting edge protruding close to the tubing string structure outer surface; catching the cutting edge on the band when the band approaches the cutting edge; and cutting the band with the cutting edge as the band passes the cutting edge.

It is to be understood that other aspects of the present invention will become readily apparent to those skilled in the art from the following detailed description, wherein various embodiments of the invention are shown and described by way of illustration. As will be realized, the invention is capable for other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Referring to the drawings, several aspects of the present invention are illustrated by way of example, and not by way of limitation, in detail in the figures.

DESCRIPTION OF VARIOUS EMBODIMENTS

Figure 1:
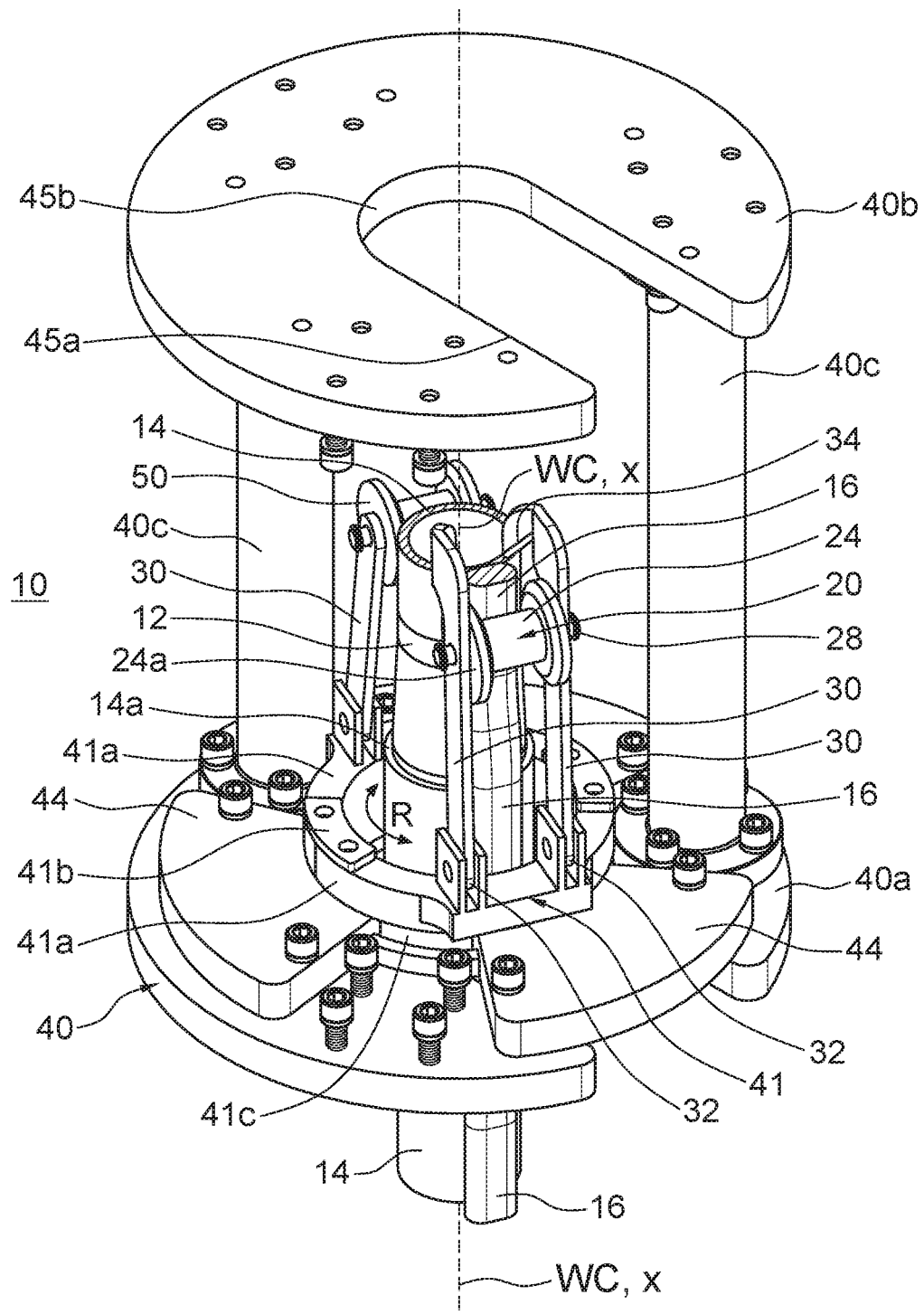
FIG. 1 is an isometric of one embodiment of an oilfield band cutter with a tubing string structure, which is a tubing string with a cable attached by bands, positioned therein. Some frame components are removed to facilitate illustration.
Figure 2:
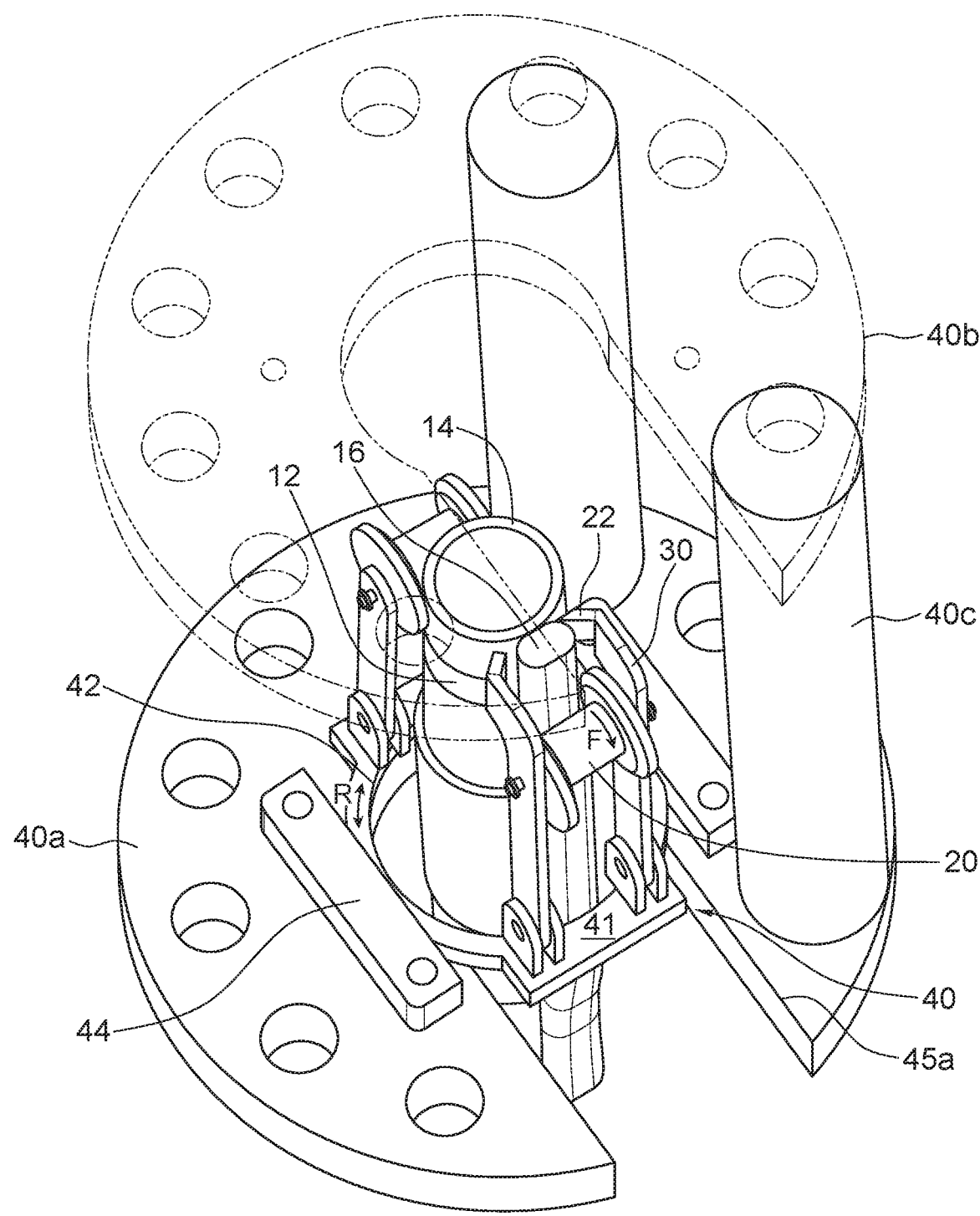
FIG. 2 is an isometric view of another embodiment of an oilfield band cutter with an upper portion shown in phantom.
Figure 3:
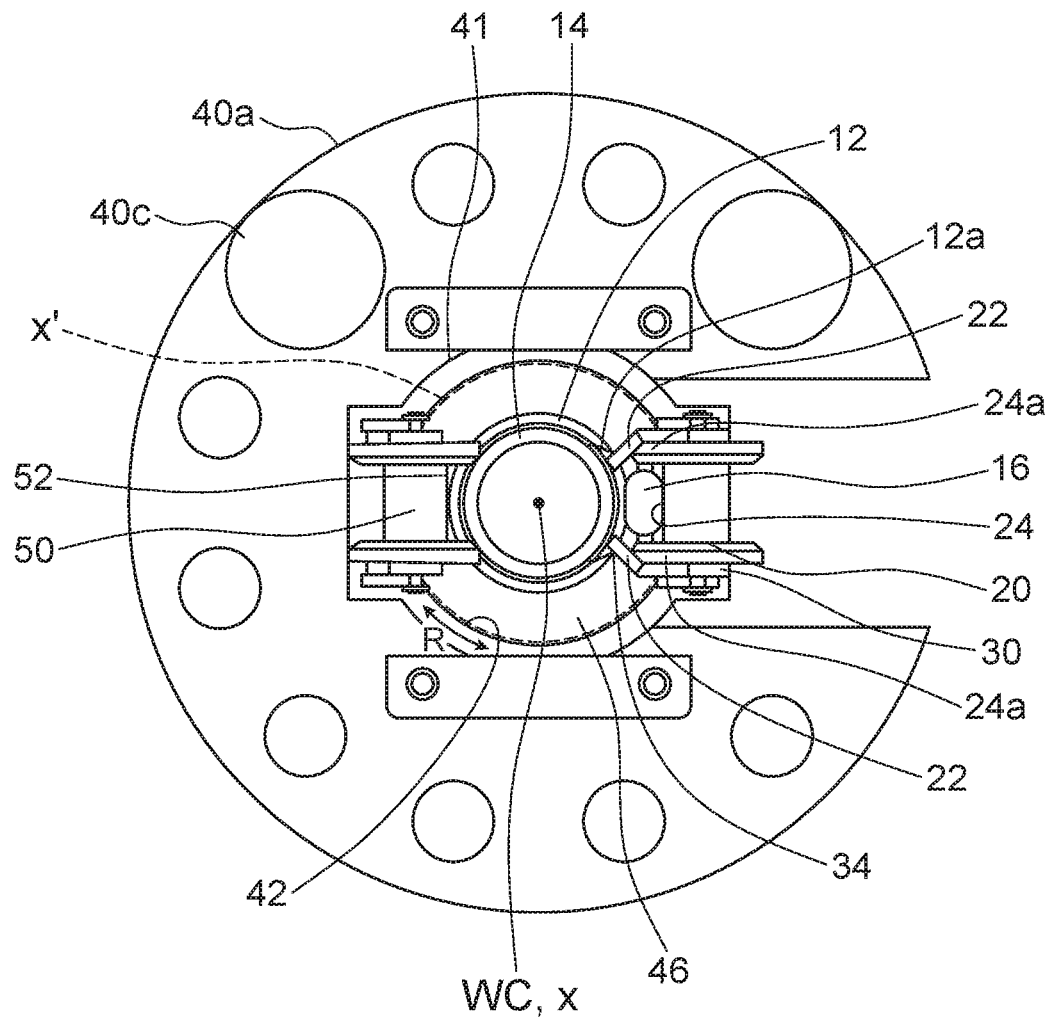
FIG. 3 is a top plan view of an oilfield band cutter.
Figure 4:
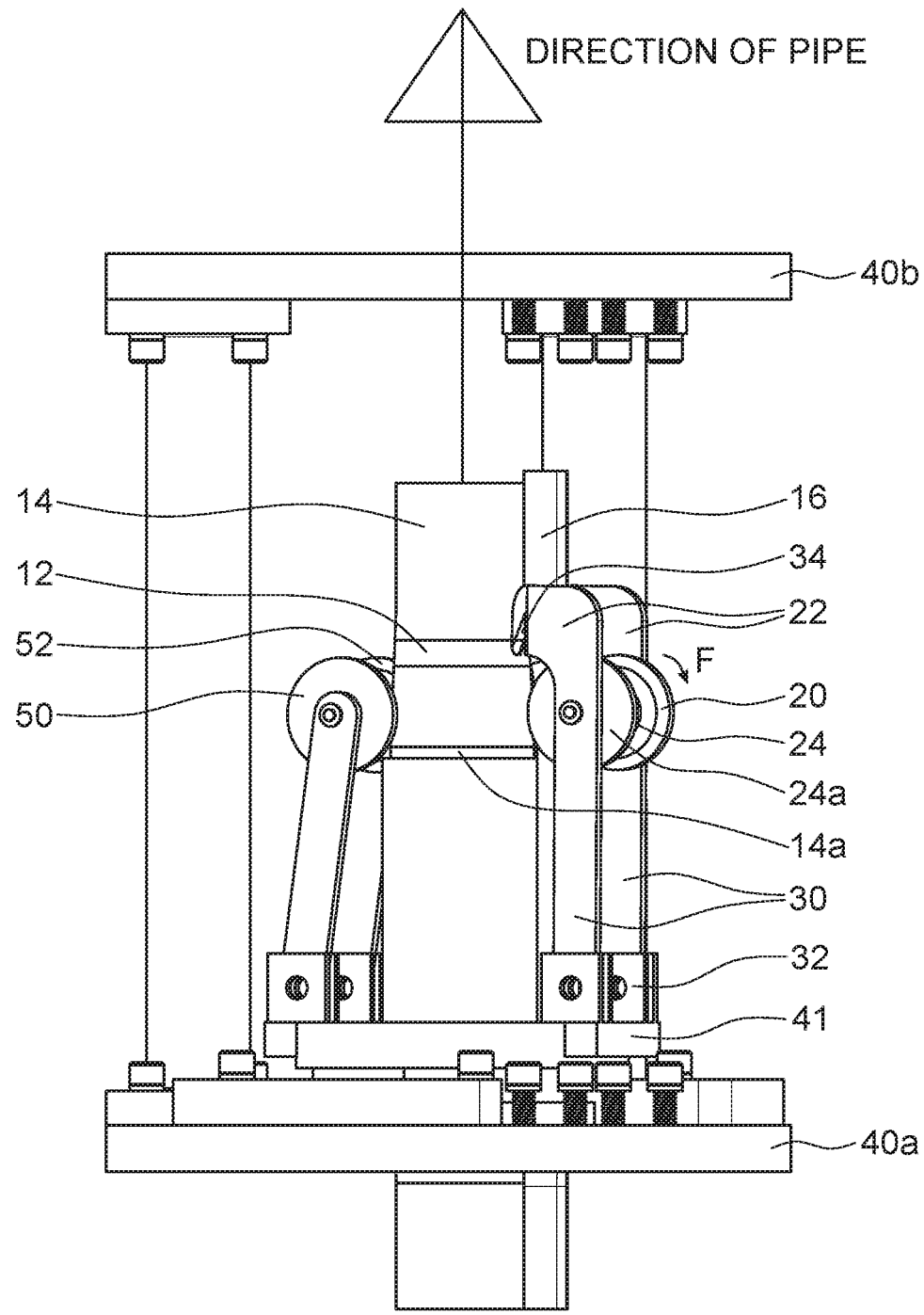
FIG. 4 is a side elevation of another embodiment of an oilfield band cutter with a tubing string, with attached cable, positioned therein. A column of the frame is removed to facilitate illustration.

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

With reference to FIGS. 1 to 4, an apparatus 10 and method have been invented for use on a tubing string structure including a tubing string 14 and an attached cable 16. Apparatus and method are for removing clamping bands 12 from the tubing string structure as it is being pulled out of a well. Apparatus 10 is sometimes referred to herein as an "oilfield band cutter". As noted above, when cable 16 is attached to tubing string 14, the cable is secured by one or more bands 12 pulled tight around tubing string structure, which in such a case is the combined tubing string and cable. There often is a taut section 12a of the band that is gapped away from the tubing string/cable outer surfaces. The taut section is formed where the band extends from a position against the tubing string outer surface to contact the outer surface and extend over the thickness of the cable.

Oilfield band cutter apparatus 10, in use, is positioned about a work area, which is the area around the well center axis WC through which a tubing string passes as it is run into and pulled out of the well. The work area extends vertically, and, as such, is elongate in the vertical direction. Specifically, this is the area above the hole on the rig floor, sometimes in the industry called a mouse hole and area around well center.

Oilfield band cutter 10 is configured around a center axis x that can be aligned with the well center axis. The central space around the center axis of the tool is an elongate work area that is vertically oriented in use. Oilfield band cutter apparatus 10 includes a tubing follower member 20 positioned in the elongate work area x' of the apparatus and a cutter 22 coupled for movement with the tubing follower member.

The tubing follower member has an elongate groove 24 on its face 26 that opens toward the elongate work area and in this embodiment facing directly toward the center axis. Being positioned in the elongate work area, the tubing follower member in use, when center axis is substantially aligned with WC, can be maintained against the outer surface of any tubing string structure moving along WC through the elongate work area. As the tubing string structure is moved along well center, tubing follower member 20 remains axially (i.e. height) fixed and rides along the outer surface of the tubing string structure. The outer surface may be the outer surface of the tubing string and/or the cable of the tubing string structure.

By selecting the orientation of the tubing follower, relative to the tubing string, elongate groove can be positioned to accommodate cable 16. For example, tubing follower 20 can be biased against the cable such that groove 24 sits over the outer diameter of the cable. As will be appreciated, an elongate groove includes two elongate side walls 24a that protrude on either side of a middle grooved area, which defines the depth of the groove. In one embodiment of tubing follower member, the distance between side walls 24a is selected to be about the same or greater than a diameter of the cable that the apparatus 10 is intended to work on such that the side walls ride along the side surfaces of the cable and a significant portion of the cable rides in the middle grooved area.

Figure 5:
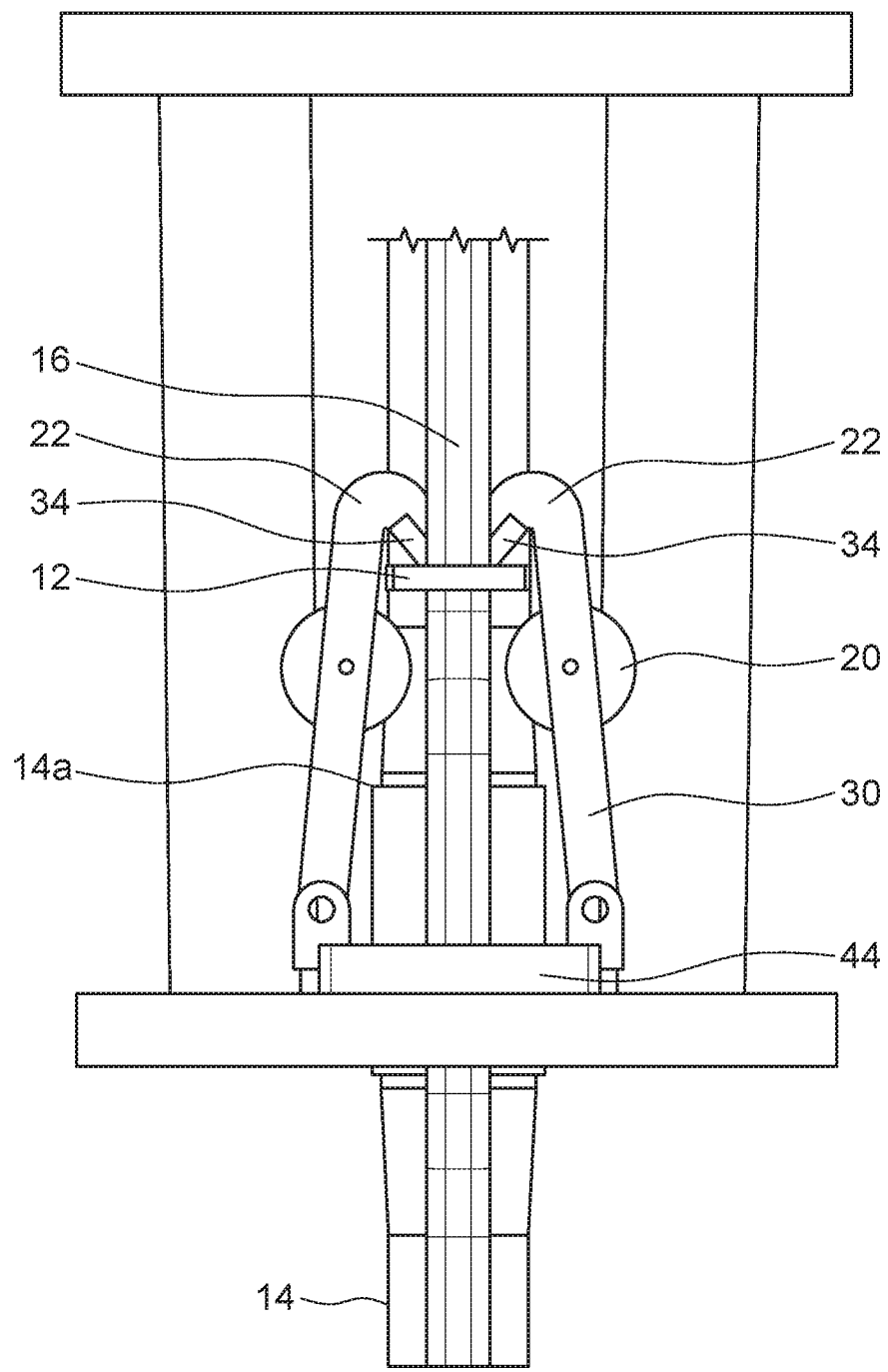
FIG. 5 is a side elevation of another embodiment of an oilfield band cutter.

With reference to FIG. 5, the tubing follower member 20 with the described vertical groove form can also ride along the tubing string outer diameter, rather than the cable.

As noted above, tubing follower member 20 rides along the outer surface of the tubing string structure with cable 16 positioned in groove 24. Member 20 may be formed generally with at least a rounded lower edge between the face of groove 24 and its lower end so that it can ride over discontinuities in the tubing string structure without snagging. Discontinuities may be where the outer surface has a diameter change that creates a bump or ledge. Typical discontinuities the band 12 or pipe joints such as the collar upper shoulder 14a.

In one embodiment, therefore, member 20 may be formed as a roller (FIGS. 1-5). In other embodiments, such as those shown in FIG. 7, member 120 may be a slider.

Considering member 20 formed as a roller as in FIGS. 1-5, the member includes a substantially cylindrical body installed such that it can rotate about a journal 28, orthogonal to the center axis, as member 20 rides along the tubing string outer surface. The roller may be formed as a spool type roller where its sides 24a protrude out beyond the middle groove portion 24, so that the groove configuration is present on the roller.

Figure 6A:
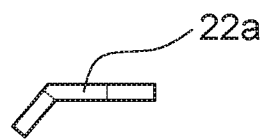
FIGS. 6A and 6B are a top end view and a side view, respectively of an arm useful in the invention with a cutter coupled thereon. The side view is depicted with the main body in plane with the page.
Figure 6B:
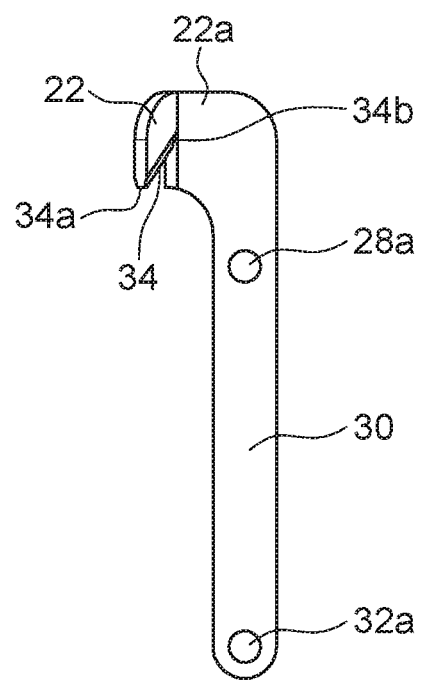

Tubing follower member 20 may be positioned and axially fixed in any of various ways in the elongate work space. In FIGS. 1-5, tubing follower member 20 is mounted on a fixed length arm that maintains member 20 as axially fixed relative to a base. Also, tubing follower member 20 is maintained against the outer surface of any tubing string structure by a biasing member that biases the member toward well center. In the illustrated embodiment, tubing follower member 20 is installed on an arm 30 with a pivotal member 32 about which the arm is biased toward the center axis. FIGS. 6A and 6B show an embodiment of an arm 30 in detail. Pivotal member 32 is received in hole 32a, while journal 28 is received in hole 28a.

As noted, apparatus 10 further includes cutter 22 coupled for movement with the tubing follower member 20. The cutter protrudes inwardly from member 20 toward the elongate work area and includes a downwardly facing cutting edge 34. The cutting edge is configured, for example is sharpened, to cut, as by slicing, through any bands that pass by. In use, the cutter is coupled to member 20 and as such, it is axially fixed relative to the rig floor and moves with the member radially inwardly and outwardly relative to well center WC. As with member 20, cutter 22 may be biased inwardly. Cutter 22 is positioned to engage against a band on an upwardly moving tubing string structure and cuts the band as the band is moved against cutting edge 34.

Cutter 22 in one embodiment, is positioned alongside a side wall 24a of the member and outwardly of the middle groove. Cutter 22 protrudes forwardly beyond the side wall such that cutting edge 34 is closer to well center WC. The cutter protrudes so that it catches on the band, while the tubing follower member rides over the band. Cutter 22 can be positioned alongside the side wall so that while member 20 rides along a cable, cutter 22 is positioned to catch on the taut portion 12a of the band that extends between the cable and the tubing string. In one embodiment such as that shown in FIGS. 6A and 6B, cutter 22 and, specifically, cutting edge 34 protrudes out from a side of the member and is angled inwardly toward the middle groove 24 of the member. In one embodiment, compared to a plane defined by the side wall 24a, the cutting edge is angled inwardly from its position alongside the side wall toward groove 24 at an angle of about 25 to 65° relative to an axis defined by the journal 28. In such a configuration, the cutter is angled to fit into the valley between cable 16 and tubing string 14.

Cutter 22 may also have its cutting edge 34 slanted, formed as a hook, wherein the outboard end 34a of the cutting edge protrudes down towards a main body portion 22a of the cutter, where the cutter is secured to member 20. This means that the outboard end of the cutting edge protrudes down towards the rig floor while a base end 34b of the cutting edge is higher and terminates at an acute angle to form a V-shaped corner against main body portion 34b of the cutter or its holder. As such, the band cannot slip past the cutting edge but instead the outboard end protrudes into the gap between the cable and the tubing string and the band, which is taut across the gap, is actually caught against the cutting edge and forced into the corner rather than slipping off the cutting edge.

While a particular shape of cutter is disclosed and shown that has been found to work beneficially, it is possible that other cutters, such as a toothed surface, a laser, a thermal knife or a knifed wheel cutter could replace the illustrated cutter 22.

In the relative arrangement of cutter 22 and the tubing follower member 20, it is desirable that the cutter be positioned to ride in the valley. Cutter 22 is installed a distance from the center point of groove 24 that is substantially the same as the radial dimension of the cable, such that the cutter 22 is properly positioned to ride alongside the cable. This distancing can be achieved by selection of the width of roller 20 between its sides 24a or by appropriately spacing the roller side edges 24a and the position of the cutting edge.

Also when considering the relative arrangement of cutter 22 and the tubing follower member 20, the cutter may be positioned to be spaced from contact with the surfaces of the cable and the tubing string so that those parts are not damaged by the cutter and the cutter does not snag on discontinuities such as pipe joints on the tubing string. In one embodiment, the cutter may be on arm 30. As shown, cutter 22 may be on an upper extension of the arm above the position of member 20 and on the end opposite that including hole 32a. Being above the position of member 20, the cutter is further away from the rig floor than the roller member. This means that for any structure on the tubing string, coming out of the well, roller member 20 rides over it first before the structure passes by the cutter. Thus, the cutter moves when the roller moves and, for example, if the roller member 20 rides over a collar, the cutter will likewise travel away from the collar's approaching upper ledge 14a and not catch it or cause damage. In one embodiment, then the vertical distance between the roller member journal 28 and the cutting edge 34 is less than the length of a collar on the tubing string such that the cutting edge 34 will pass the upper shoulder 14a of the collar before roller member 20 moves radially inwardly off the lower end of the collar. Typically, the vertical distance between the roller member journal 28 and the cutting edge 34 is much less than the collar length such as between 1 and 2 inches.

In an embodiment with the cutter installed higher than member 20, to be clear, the orientation of the cutting edge to be angled inwardly from its position alongside the side wall at an angle of about 25 to 65° relative to an axis defined by the journal 28 can still apply and will be apparent in end view.

While the band can be cut by one cutter, redundancy and better performance (for example avoidance of torqueing stress on arm 30) may be achieved by providing a cutter 22 on each side of the tubing follower member. Where there are two cutters, they may be substantially symmetrically arranged on the two sides of groove 24. For example, they may each be configured to have the substantially the same distance from and inwardly protruding angle relative to the member and specifically the axis defined by journal 28. Alternately, if there is a desire to mitigate multiple cuts on a band, the cutters can be vertically offset from each other, such as a different distance from journal 28, where one cutting edge protrudes downwardly toward the base further than that of the other cutter.

In use, the tubing follower member is installed adjacent well center. While the tubing follower could be installed on an existing rig structure, it may be convenient for the apparatus to include a frame 40 including a base 41 such that the apparatus can be readily moved into place when needed and removed when no longer needed. The base receives connection of arm 30 and is configured to be mounted in the rig. While other embodiments such as a simple block form are possible, in one embodiment, base 41 is generally ring shaped to substantially encircle the mouse hole. Such a base 41 includes a hole 42 that extends through the base's thickness from an upper surface to a lower surface of the base. The hole can be aligned over the rig floor mouse hole with a center point of hole 42 aligned with well center WC. The hole has a diameter sufficient to allow the tubing string structure to pass therethrough. Hole 42, then, defines thereabove the elongate working area x' through which a tubing string structure is moved when exiting the borehole. In particular, the elongate work area x' of the apparatus is that area in and above hole 42. Area x' has the same diameter as hole 42 and extends upwardly from base 41. That is the area in which the tubing string structure passes up through apparatus and the area in which tubing string follower 20 and cutters 22 act.

Tubing follower member 20 is then coupled to the base and is positioned over hole 42 in elongate work area x'. Specifically, in the illustrated embodiment, arm 30 is pivotally connected to base 41 and biased toward axis x.

Base 41 can be aligned over the mouse hole. If base 41 is a circular member and if a tubing string 14, cables 16 or other structures are already extending up through the rig floor at well center, then the base may be threaded over the structures and then installed on the rig aligned with the mouse hole. Alternately, base 41 may either be less than fully circular for example C-shaped with an opening through which the structures may pass to position the frame with its hole 42 centered on WC or it may be comprised of a plurality of parts such as segments of a circular ring that can be secured. In one embodiment illustrated in FIG. 1, base 41 includes a plurality of parts, specifically two semi-circular ring segments 41a that are joined and secured by joiner plates 41b and bolts.

Base 41 can be removably secured above the rig floor such as by retainer plates 44. Retainer plates 44 hold the base vertically fixed relative to the rig floor, such that it cannot be pulled away from the rig floor. However, retainer plates 44 may allow the base 41 to be rotated, arrows R, about the center axis of the band cutter and therefore about well center WC. Thus, base 41, and thereby arm 30, follower roller member 20 and cutter 22 thereon, can be rotated to properly position roller member 20 relative to the location of the cable 16 on the tubing string. Plates 44 can be configured to hold base 41 such that it can swivel freely to automatically follow the location of the cable 16 on the tubing string as it emerges from the well. In the embodiment of FIG. 1, base 41 includes an annular indented gland 41b between upper and lower shoulders and retainer plates 44 protrude into the gland and hold the base against axial movement, while the base can rotate about an axis coaxial with WC within the arrangement of plates 44. In the embodiment, of FIGS. 2 and 3, the retainer plates 44 clamp down over an upper surface of base 41.

While base 41 and plates 44 may be positioned directly on rig, in one embodiment frame 40 defines a working window on which the base 41 and plates 44 are installed. The frame, therefore, may include a lower frame plate 40a to receive and accommodate base 41 and plates 44. Lower frame plate 40a may be sized and may include bolt holes for receiving plates 44, such that the apparatus can be readily assembled. Apparatus 10 via frame 40 may also be moveable as a single unit. Frame 40 may further include an upper frame plate 40b and columns 40c connecting plates 40a, 40b. Columns 40c may be connected between plates 40a, 40b by bolts such that the ends of the frame can be externally flush. Thus, frame 40 with the plates and the columns defines therewithin the working window including the elongate work area centrally therein. One or more columns and plate 40b are shown removed or in phantom in some Figures to facilitate illustration.

Plate 40a may include a slot 45a leading to a central hole. Plate 40b, if present, may also include a slot 45a leading to a central hole 45b, which are axially lined up with the slot and the hole on plate 40a. These slots permit the frame to be slid from the side into position on the rig coaxial with well center WC even if there are tubing string or cable structures already extending along WC. Thus, the tubing string structure can be positioned readily in holes 45b, and member 20 and cutter 22 can be positioned against the tubing string structure. Plate 40a, and if present plate 40b, are load and torque bearing. Plate 40a being quite large and heavy holds its position well on the rig, but can be secured if desired. Plate 40a is fixed during use but permits rotation of base 41 thereon, while holes 42 and 45b remain substantially coaxially positioned.

Upper plate 40b can accommodate lifting eyes for movement of the frame. Alternately or in addition, upper plate 40b provides a site for other structures such as guide shives for the cable, etc.

Hole 42 or hole 45b on lower plate 40a may accommodate, and have installed therein, an annular barrier 46, such as a wiper seal or brush, that extends radially inwardly from the hole toward the center point of the hole. This seals the annular area between the apparatus and tubing string structure 14 and prevents debris, such as cut bands from falling down through the frame. Thus, debris is prevented from falling into rig apparatus such as the slips on the rig, or therepast into the well.

The apparatus may further include a device for catching the cut bands. The device may include a trough or finger between base 41 and cutter 22 that collects the bands as they are cut. A trough may be below the cutters 22 and may slope to a side away from cutters 22.

The oilfield band cutter may include a second tubing follower member 50 diametrically positioned across the elongate work area from tubing follower member 20. The second member is similar to member 20 and, for example, also has an elongate groove 52 facing the axis x, well center WC and member 20. The second roller member 50 acts as a centralizer to balance forces against the tubing string and as a stabilizer and guide, to keep the tubing string from escaping the roller 20 and cutter 22 and the roller 20 in contact and tension with the tubing string.

While second tubing follower member 50 may be free of cutters, FIG. 5 shows an alternate embodiment. If there is a very wide or second cable on the tubing string structure, second tubing follower member 50 may have one or more cutters 54 coupled thereto, operating in the same manner as cutters 22.

In use, when there is a need to cut bands from a tubing string structure being pulled out of the well, tubing follower 20 and cutter 22 can be installed on the rig and positioned to act against tubing string structure 14 emerging from the well. Possibly, frame 40, including plate 40a and possibly plate 40b and columns 40c, can be moved to have its holes 45b coaxial with the well center WC and can be supported on the rig, such as on the rig floor. If there is a tubing string 14 already extending along well center up from the rig floor, the frame may be placed by sliding it in from the side for example with the slots 45a aligned with and moved past the tubing string until the tubing string is positioned coaxially within hole 45b.

During this positioning process, if there is no tubing string at well center, base segments 41a, and therefore arms 30, roller 20 and cutters 22, may be already in place within the elongate working area. However, if there is a tubing string 14 already extending along well center, the frame may be placed without base segments 41a in place or at least the segment that extends across the slot 45a is omitted.

Eventually, segments 41a are in place and roller member 20 is positioned, and possibly biased, against the outer surface of the tubing string with cable 16 positioned in the groove 24. If necessary, base 41 can be swiveled relative to base plate 40a, for example by the action of retainer plates 44.

When roller member 20 is positioned against the outer surface of the tubing string with cable 16 positioned in the groove 24, cutter 22 is positioned protruding into the valley between the cable and tubing string outer diameter. The tubing string may then be moved out of the well, which means it will move upwardly past the cutters (i.e. in a direction from base 41 toward cutters). Thus, anything on the tubing string is moved toward cutting edge 34, which is oriented facing down toward base 41.

Cutter 22 engages against the band, for example the taut portion of band 12 that extends across the valley between the cable and tubing string outer diameter, and thereby cuts the band. In particular, outboard end 34a of the cutting edge becomes inserted into the gap behind band 12 and the band is moved against the cutting edge. Even if the band is not initially cut, it eventually moves into the V-shaped corner between cutting edge 34 and body 22a and is cut as the tubing string continues to move upwardly.

The groove on member 20 ensures that it remains centered on and follows the position of the cable such that cutter 22, which is carried alongside the roller member 20, remains positioned alongside the cable. Since the cutter is carried on and moves with member 20, cutter 22 is lifted radially outwardly whenever roller member rides over an enlargement on the tubing string structure outer surface. Thus, cutters 22 are lifted away from discontinuities such as collar shoulders 14a on the tubing string to prevent catching thereon. If it is found that cutter 22 still tends to catch on discontinuities, cutter 22 can be positioned vertically above the member 20.

The cut bands may fall away from the tubing string, but annular barrier 46 prevents them from falling down past frame 40 into the rig apparatus or well.

Along with making the procedure of cutting bands safer and faster, apparatus 10 may also clear the tubing structure of the other material so a proper inspection or scan of the tubing may be completed on the trip (pulling of the tubing). This prevents the company from having to re-trip the pipe and inspect when it is clear or shipping the pipe to a plant for inspection.

While the benefits and method of operation remain generally the same, further embodiments of oilfield band cutters are disclosed in FIGS. 7-13.

Figure 7:
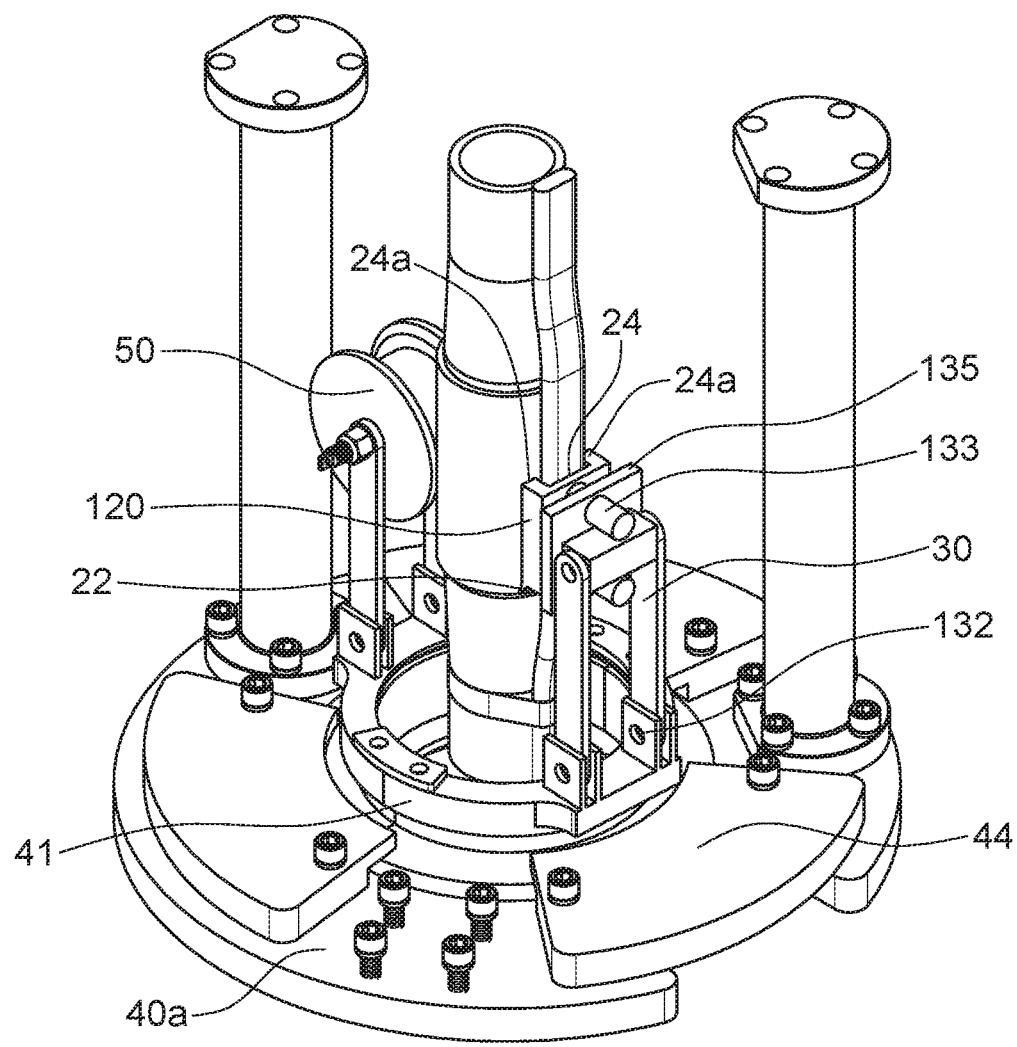
FIG. 7 is an isometric of another embodiment of an oilfield band cutter with a tubing string structure, positioned therein. Some frame components are removed.
Figure 8:
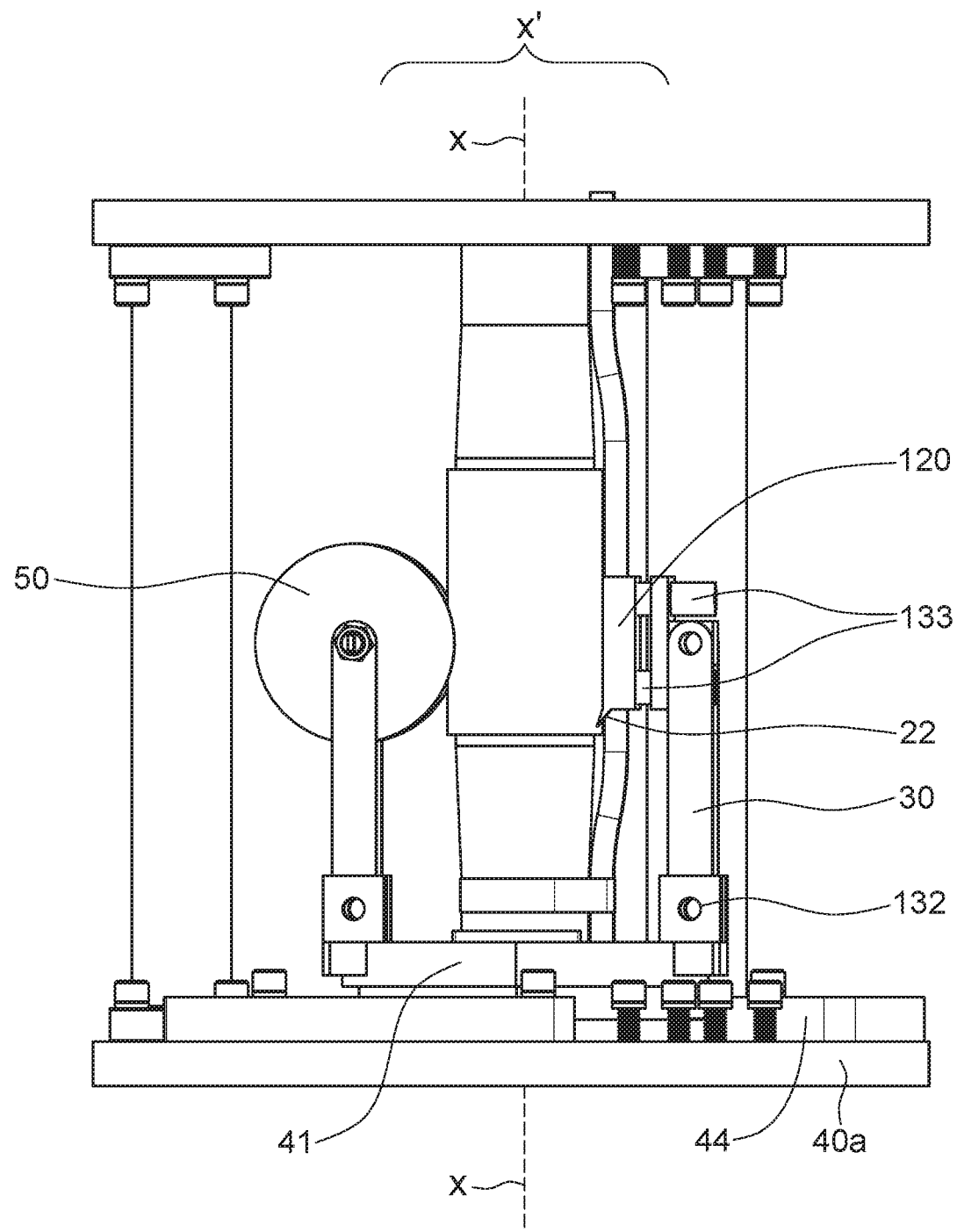
FIG. 8 is a side elevation of the oilfield band cutter of FIG. 7.
Figure 9:
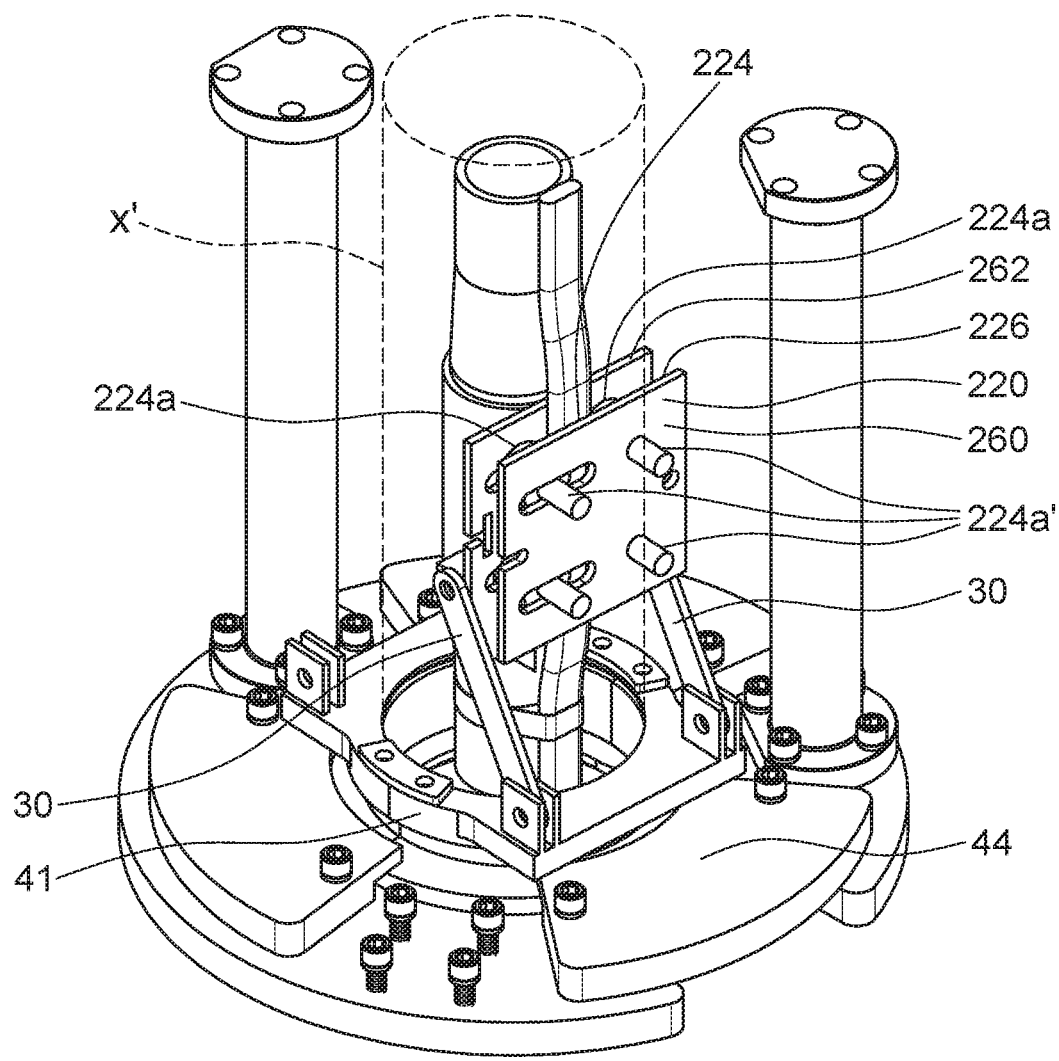
FIG. 9 is an isometric of another embodiment of an oilfield band cutter with a tubing string structure, extending therethrough. Some frame components are removed.
Figure 10:
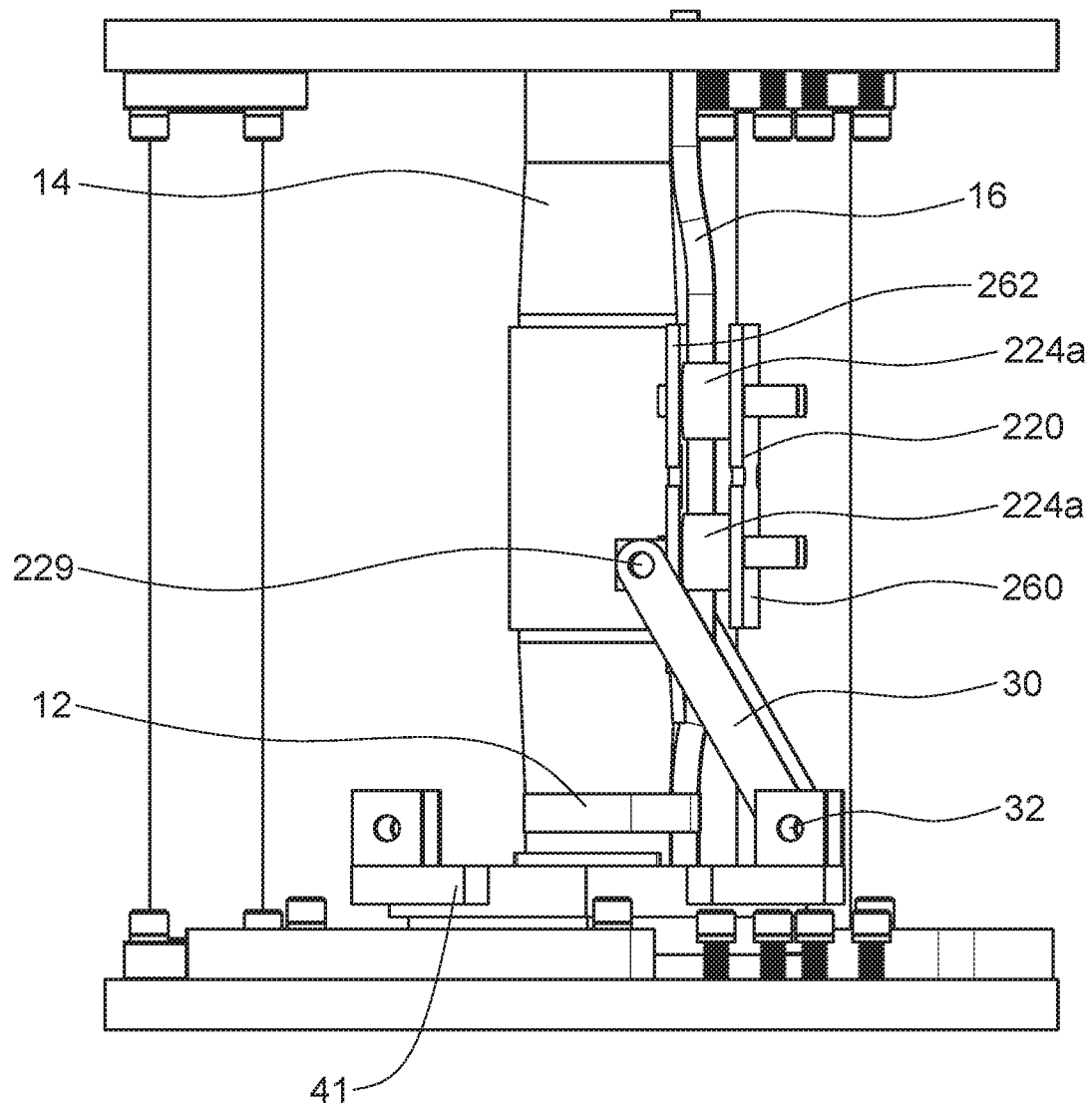
FIG. 10 is a side elevation of the oilfield band cutter of FIG. 9.
Figure 11A:
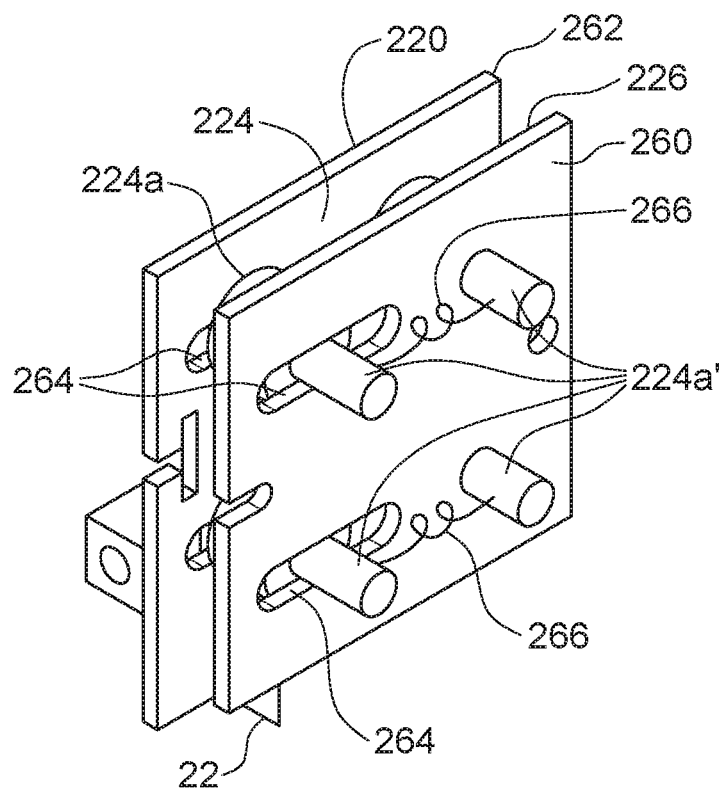
FIG. 11A is an isometric of the tubing follower member and the cutter of FIG. 9.
Figure 11B:
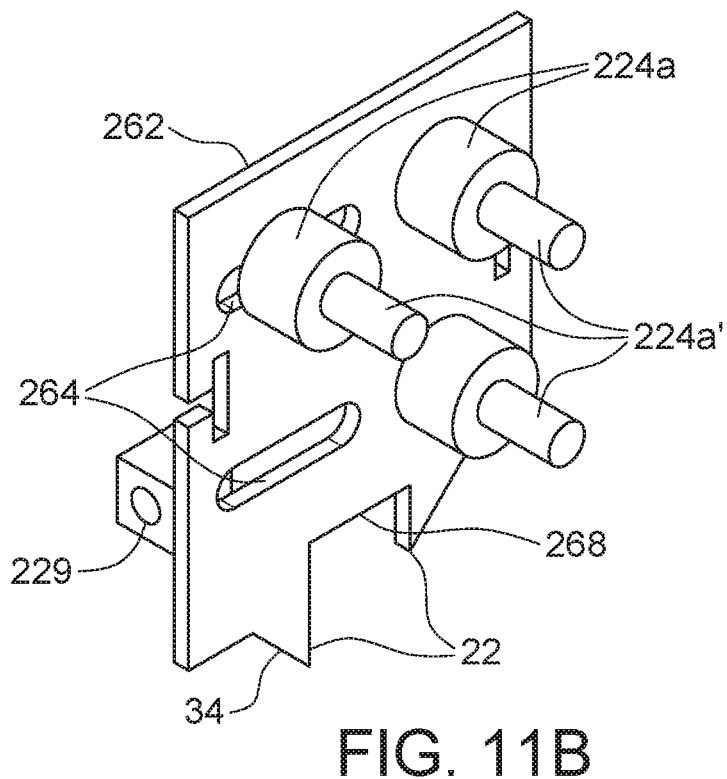
FIG. 11B is an isometric of the tubing follower member and the cutter of FIG. 11A with the outer plate and some roller components removed.

One embodiment is illustrated in FIGS. 7-8, which compared to FIGS. 1-5, shows alternates as follows:

Tubing follower member 120 is a slider rather than a roller, but still has elongate groove 24 between side walls 24a on its side facing the elongate work area.

While one or more cutters 22 are carried on the tubing follower member as described above, where there are a plurality of cutters, they are positioned offset with one positioned lower than the other. This ensures that the band is only cut once and there are fewer cut pieces. In this embodiment, there two cutters 22, one on each side of groove 24. One cutter (the one visible in FIG. 8) is vertically offset, protruding lower, than the other cutter to contact an upwardly advancing band ahead of the other cutter. However, if the lower cutter misses or fails to cut the band, the vertically higher cutter can then cut the band. Ensuring that the band is cut only once, results in fewer band pieces, thus facilitating clean up and avoiding parts falling into the well or becoming caught up in rig apparatus.

The base connection 132 fixes arm 30 in a non-pivotal position. There is a biasing member such as springs 133 that bias the tubing follower member 120 towards the center axis x. Springs 133 are positioned between the tubing follower member 120 and a holder 135 on arm 30. Therefore, member 120 is maintained biased against the cable, with the cable in groove, but can flex and can ride over discontinuities in the tubing string structure without snagging. Springs 133 for example have sufficient stroke to allow the tubing follower and cutters 22 to ride over the discontinuities. There may be set screws between the follower member and the holder to permit adjustment of the position and depth of groove 24.

Base 41 can both rotate and translate as retained by retainer plates 44 on base plate 40a or rig floor. The sizing of plates 44 versus the outer diameter of base 41 can be selected to permit base 41 with an amount of lateral movement such that the center axis of the band cutter can vary relative to well center WC. Plates 44 act as bearings for base 41 permitting both swiveling and lateral movement of the base, but substantially restricting axial, vertical movement of the base along the center axis. To minimize friction between plates 44, base 41 and plate 40a, bearings, such as rollers, ball bearings or a low friction coating can be installed to act between the parts. While arm 30 is non-pivotally fixed to base 41, the rotational and translational movement of base 41, along with second tubing follower 50, ensures that tubing follower member 120 remains in position maintained against cable 16 even when the tubing string laterally wobbles or there are enlargements thereon. In this embodiment, as base 41 translates, center axis x of the tool (i.e. the center point of hole 42) may move into and out of alignment with well center WC.

Another embodiment is illustrated in FIGS. 9-11B, which compared to FIGS. 1-5, shows alternates as follows:

Base 41 can both rotate and translate while retained by retainer plates 44 on base plate 40a or rig floor, as described above with respect to FIGS. 7 and 8.

Tubing follower member 220 fully encircles the cable with an outer plate 260, an inner plate 262 and side rollers 224a that are positioned between the plates. Effectively, tubing follower member 220 continues to have an elongate groove 224 between side rollers 224a on the inwardly facing side 226 of outer plate 260. Inner plate 262 is opposite and extends over the groove. A releasable fastener joins the plates 260, 262.

Side rollers 224a act as bearings for passage of the cable through member 220. Rollers 224a are journalled to rotate about axis orthogonal to the plane of the plates. There is at least one roller on the left side of the plate and one roller on the right side of tubing follower member leaving a space between, which defines groove 224. The mount of at least one of the side rollers may be configured to permit sliding movement toward and away from the other side roller. For example, in one embodiment, aligned slots 264 are provided in plates 260, 262 for mounting the axle pin 224a' of one of the side rollers. Springs 266 may be installed to bias the rollers toward each other, specifically to bias the moveable side roller along its slot 264 toward the side roller on the other side of the groove 224. There may be multiple left side and right side rollers, for example a pair on each side as shown.

Tubing follower member 220 is supported on one or more arms 30. Arms 30 may be pivotally moveable, where the arms are connected at their base ends via pivotal connections 32 to the base 41 and the tubing follower member is connected to the arms by pivotal connections 229 to permit the tubing follower member to pivot from and to a vertical position.

One or more cutters 22 are coupled to the inner plate 262 and are, thereby, positioned to cut the band extending between cable 16 and tubing string 14. As will be appreciated, simply sharpening the lower edge of plate 262 is sufficient to guarantee a cut. In this embodiment, there are two cutters 22, one positioned below the left hand side roller and the other positioned below the right hand side roller. One cutter (the left hand side one in FIG. 11B) is vertically offset, protruding lower, than the other cutter to try to mitigate multiple cuts on a single band. There may also be a notch 268 in plate 262 between cutters 22 to ensure that the cable is maintained centered between the cutters.

In use, plates 260, 262 and side rollers 224a maintain the tubing follower member and the cutters thereon in contact with the tubing string structure and in position to cut bands 12. In particular, plates 260, 262 and side rollers 224a surround and capture cable 16 within the tubing follower member and centered between cutters 22. Plate 262 is installed between cable 16 and tubing string 14 and outer plate 260 is secured to plate 262, which clamps cable 16 therebetween. Springs 266 bias the rollers 224a against the sides of the cable, but permit the distance between left side and right side rollers 224a to vary to allow passage of splices, etc. where the cable is wider. Rollers 224a act as bearings to facilitate passage of the cable through the fixed tubing follower member 220.

As cable 16 is pulled up through the tubing follower member, the cutters 22, which are generally aligned with rollers 224a, are positioned to ride along the sides of the cable and cut the band as it is driven against the cutters. If the band slides along the slanted cutting edge, it is eventually stopped in the acute angle where the cutting edge meets at a V-shaped area to the base. The band is then positively cut.

Inner plate 262 receives the greatest stresses during operation, due to being wedged between tubing string 14 and cable 16, while these structures move therepast. Cutters 22 acting against the bands. Thus, it is best to have pivotal connection 229 on inner plate 262.

It has been found that when bands are cut, as the tubing string structure moves up through the rig floor, the cable is pulled away from tubing string 14 by the pick-up reel. Sometimes, while the tubing string remains concentric with well center, the cable is being pulled away at an angle sometimes of about 50° from vertical. With this embodiment, tubing follower is maintained on cable and there is little chance of it being caught on discontinuities.

Figure 12:
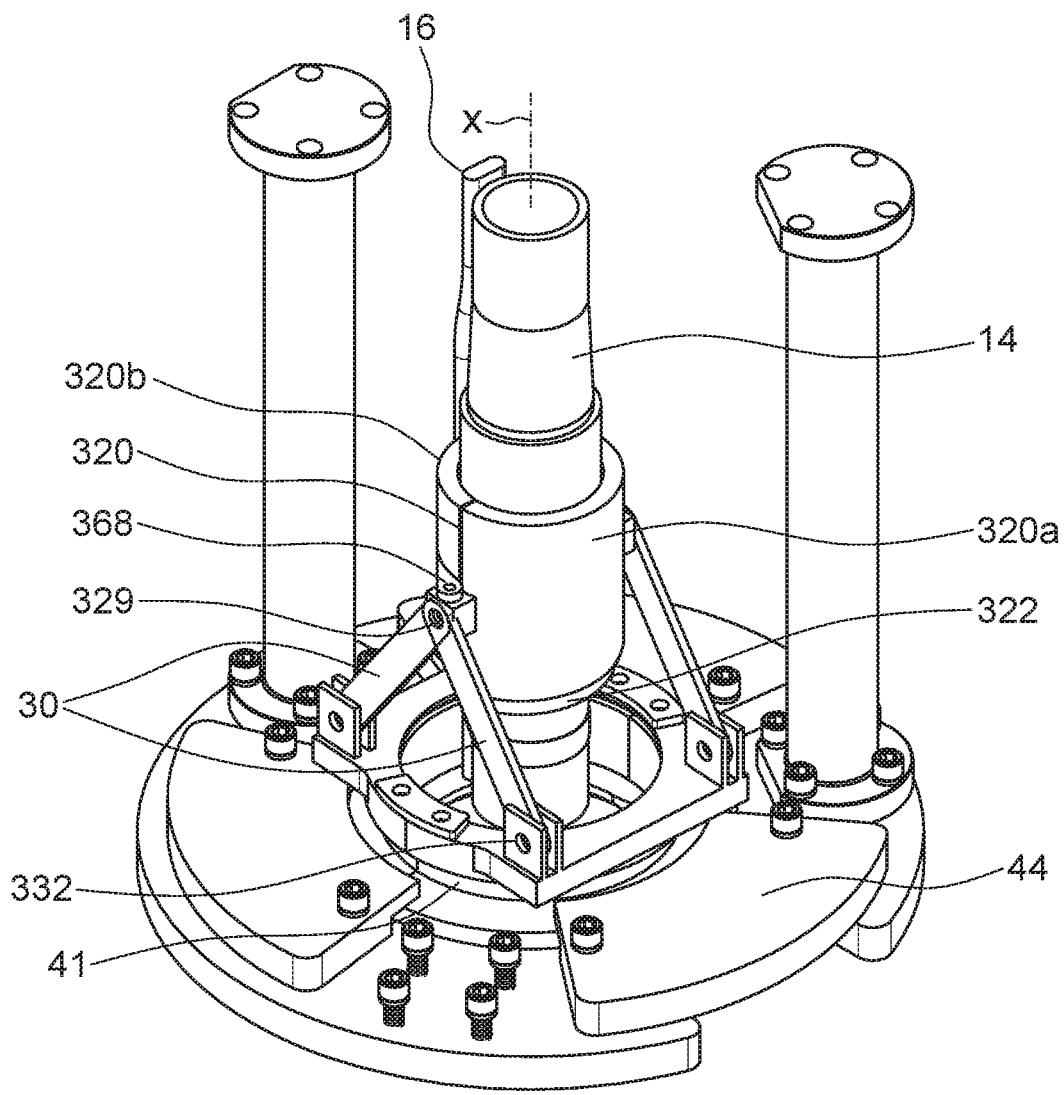
FIG. 12 is an isometric of another embodiment of an oilfield band cutter with a tubing string structure, positioned therein. Some frame components are removed.
Figure 13:
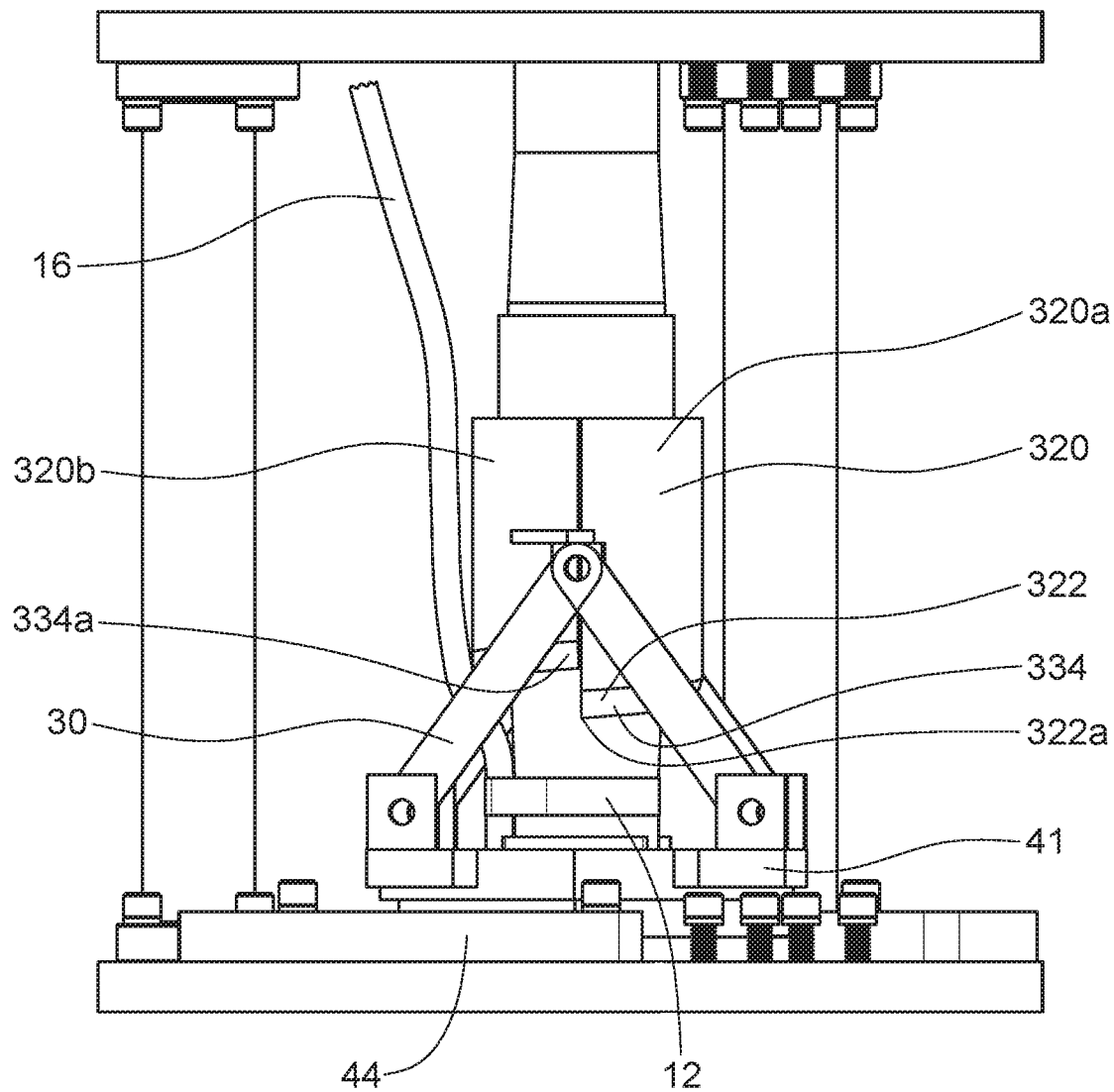
FIG. 13 is a side elevation of the oilfield band cutter of FIG. 12.

With reference to FIGS. 12 and 13, the oilfield band cutter 310 illustrated therein has certain variants from FIGS. 1 to 11B. For example, the tubing follower member 320 is a collar that fully encircles the tubing string 14 of the tubing string structure. Specifically, member 320 includes two half cylinders 320a, 320b with a latch such as a pad eye 368 between them.

Arms 30 support member 320 in a position with its center axis aligned along the center axis x. Arms 30 are substantially rigidly connected between connections 329, 332. Base 41 can rotate and translate laterally to accommodate wobble in the tubing string structure.

One or more cutters 322 are coupled to the collar, for example, along its lower edge. In one embodiment, the entire circumference of the collar along its lower edge is sharpened as a cutting edge 324. To ensure that the band is cut only once, the lower edge may be angled. For example, the lower edge of the collar may have a lower-most downwardly protruding tip 322a and the edge 334 may extend helically upwardly from the tip to a terminal portion 334a of the cutting edge, which is vertically recessed from tip 322a.

In use, member 320 is opened and clam-shell style, the collar halves 320a, 320b are wrapped around and encircle the tubing string. This inserts collar 320 between cable 16 and tubing string 14 with cutters 322 facing down towards the well. As the tubing string structure is pulled up, the tubing string moves up through the tubing follower member collar 320 and the cable/accessory lines run outside the collar. The cutting edge 334 wedges between the cable and the tubing string and is thereby positioned cut the bands as they are driven against the underside of the member. The cutting collar 320 has an edge or inner bevel that allows it to pass over the tubing collar. The helically receding edge 334 contacts the circumference of the band in one area.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

The invention claimed is:

1. An oilfield band cutter comprising: a tubing follower member maintained over an elongate work area through which a tubing string can pass along an axis, the tubing follower member having a face with an elongate groove; a cutter coupled for movement with the tubing follower member, the cutter protruding in the elongate work area and including an underside on which a cutting edge is positioned; and a frame including an at least partially ring-shaped base with a center point alignable with the axis, the at least partially ring-shaped base being rotatable about the axis and the tubing follower member being coupled to the at least partially ring-shaped base.

2. The oilfield band cutter of claim 1 wherein the elongate groove is oriented parallel to the axis.

3. The oilfield band cutter of claim 1 wherein the tubing follower member includes a roller defining at least a part of the groove and the roller has an axis of rotation substantially orthogonal to the axis.

4. The oilfield band cutter of claim 1 wherein the tubing follower member is configured as a slider with the groove facing the axis.

5. The oilfield band cutter of claim 1 wherein the tubing follower member is biased radially inwardly toward the axis.

6. The oilfield band cutter of claim 1 wherein the cutter is positioned alongside the groove and the cutting edge is positioned closer to the axis than the elongate groove.

7. The oilfield band cutter of claim 6 wherein the cutter is angled such that an outboard end of the cutting edge protrudes out over the elongate groove.

8. The oilfield band cutter of claim 6 further comprising a second cutter positioned on a side of the elongate groove opposite the cutter.

9. The oilfield band cutter of claim 8 wherein the cutter is positioned closer to a bottom end of the elongate groove than the second cutter.

10. The oilfield band cutter of claim 1 wherein the cutting edge is slanted and terminates at an acute angle against a main body to form a V-shaped corner against the main body.

11. The oilfield band cutter of claim 1 wherein the tubing follower member and the cutter are mounted on an arm coupled to the frame.

12. The oilfield band cutter of claim 11 wherein the arm is biased radially inwardly toward the axis.

13. The oilfield band cutter of claim 1 further comprising a second tubing follower member installed substantially diametrically opposite the tubing follower member and the second tubing follower member includes a vertically grooved surface facing the elongate groove.

14. The oilfield band cutter of claim 1 wherein the at least partially ring-shaped base is laterally translatable relative to the axis.

15. The oilfield band cutter of claim 1 wherein the tubing follower member is biased toward the center point.

16. The oilfield band cutter of claim 1 wherein the frame further comprises a lower frame plate to receive and accommodate the at least partially ring-shaped base and wherein the lower frame plate includes a slot extending from an outer edge to a central hole through the lower frame plate and the at least partially ring-shaped base includes a removable segment, such that the frame includes access for moving a structure from the outer edge into a position within the central hole.

17. The oilfield band cutter of claim 16 wherein the frame further comprises an upper frame plate and columns connecting the upper frame plate to the lower frame plate and the tubing follower member and the cutter are positioned in a vertical space between the upper frame plate to the lower frame plate.

18. The oilfield band cutter of claim 1 further comprising an annular barrier between the apparatus and the axis positioned below the cutter.

19. A method for removing a band from a tubing string structure as the tubing string structure is being moved up from the well, the method comprising:
sliding a frame for the tubing follower member sideways around the tubing string structure; after sliding, positioning a tubing follower member against a side of the tubing string structure as the tubing string structure is moved up from the well past the tubing follower member, the tubing follower member carrying a cutter with a cutting edge protruding close to the tubing string structure outer surface; catching the cutting edge on the band when the band approaches the cutting edge; cutting the band with the cutting edge as the band passes the cutting edge; and wherein positioning includes installing an at least partially ring-shaped base on the frame to encircle the tubing string structure, the ring-shaped base having the tubing follower member coupled thereto and rotating the at least partially ring-shaped base to align the cutter with an exposed taut portion of the band extending between a cable connected by the band to a tubing string in the tubing string structure.

20. The method of claim 19 wherein the tubing follower member has an elongate groove and during moving, the elongate groove remains vertically fixed relative to the well and the cable is moved along the elongate groove.

21. The method of claim 19 wherein the tubing string structure includes the tubing string and the cable secured together by the band and the band extends across a valley between the tubing string and the cable and wherein during catching the cutter protrudes into the valley.

* * * * *